US00RE40087E

(19) United States
(12) Reissued Patent
Komaki

(10) Patent Number: US RE40,087 E
(45) Date of Reissued Patent: Feb. 19, 2008

(54) COATING COMPOSITION AND OPTICAL RECORDING MEDIUM

(75) Inventor: Tsuyoshi Komaki, Komoro (JP)

(73) Assignee: TDK Corporation, Tokyo (JP)

(21) Appl. No.: 10/912,770

(22) PCT Filed: Sep. 25, 1998

(86) PCT No.: PCT/JP98/04286

§ 371 (c)(1),
(2), (4) Date: Mar. 27, 2000

(87) PCT Pub. No.: WO99/16835

PCT Pub. Date: Apr. 8, 1999

Related U.S. Patent Documents

Reissue of:
(64) Patent No.: 6,437,017
Issued: Aug. 20, 2002
Appl. No.: 09/508,519
Filed: Mar. 27, 2000

(30) Foreign Application Priority Data

Sep. 27, 1997 (JP) ..... 9-279651

(51) Int. Cl.

| | |
|---|---|
| ***C08F 2/46*** | (2006.01) |
| ***C08F 20/06*** | (2006.01) |
| ***C08F 20/18*** | (2006.01) |
| ***C08F 4/48*** | (2006.01) |
| ***B32B 1/00*** | (2006.01) |

(52) U.S. Cl. ..... 522/182; 522/71; 522/74; 522/78; 522/81; 522/83; 522/184; 522/121; 522/77; 428/64.1

(58) Field of Classification Search ..... None
See application file for complete search history.

(56) References Cited

U.S. PATENT DOCUMENTS 4,592,254 A 6/1986 Wallis
4,592,954 A 6/1986 Malhotra
4,981,743 A 1/1991 Ho (Continued)

FOREIGN PATENT DOCUMENTS

| | | |
|---|---|---|
| EP | 0 652 555 | 5/1995 |
| JP | 55-051583 | 4/1980 |
| JP | 60-168651 | 9/1985 |

(Continued)

OTHER PUBLICATIONS

International Search Report dated Jan. 6, 1999.

Supplementary European Search Report dated Oct. 26, 2001.

International Preliminary Report dated May 19, 2000.

Notice of Rejection dated Feb. 27, 2007 issued for the corresponding Japanese Patent Application No. 9–279651.

*Primary Examiner*—Sanza L. McClendon
(74) *Attorney, Agent, or Firm*—Rader, Fishman & Grauer PLLC

(57) ABSTRACT

There are provided a composition for coating which can form an ink receiving layer having excellent adhesion with hydrophobic substrates, water-resistance and printing stability, and an optical recording medium having an ink receiving layer formed from this composition. The composition contains a radiation-curable compound (A) composed of 50 to 90% by weight of a monofunctional (meth) acrylic monomer and 10 to 50% by weight of a multifunctional (meth) acrylic monomer, a water-absorbing organic filler (C) in an amount of 10 to 60% by weight relative to (A), and a water-absorbing inorganic filler (D) in an amount of 1 to 20% by weight relative to (A). This composition is applied on a protecting film (6) and cured to form an ink receiving layer (7), to obtain an optical disk (1).

7 Claims, 1 Drawing Sheet

U.S. PATENT DOCUMENTS

| | | | | |
|---|---|---|---|---|
| 5,573,831 | A | * 11/1996 | Suzuki et al. | 428/64.1 |
| 5,681,643 | A | 10/1997 | Noguchi et al. | |
| 5,798,161 | A | 8/1998 | Kita et al. | |
| 5,798,397 | A | 8/1998 | Noguchi et al. | |
| 5,972,457 | A | 10/1999 | Matsuishi et al. | |
| 6,437,017 | B1 | 8/2002 | Komaki | |

FOREIGN PATENT DOCUMENTS

| | | | |
|---|---|---|---|
| JP | 60-262685 | A | 12/1985 |
| JP | 60262685 | A | 12/1985 |
| JP | 61193879 | A | 8/1986 |
| JP | 1-165050 | A | 6/1989 |
| JP | 7-61114 | A | 3/1995 |
| JP | 7-96655 | A | 4/1995 |
| JP | 7-169100 | A | 7/1995 |
| JP | 8-165441 | A | 6/1996 |
| JP | 8-283529 | A | 10/1996 |
| JP | 9-208853 | A | 8/1997 |
| JP | 9-245380 | A | 9/1997 |
| JP | 10-114810 | A | 5/1998 |

* cited by examiner

COATING COMPOSITION AND OPTICAL RECORDING MEDIUM

Matter enclosed in heavy brackets [ ] appears in the original patent but forms no part of this reissue specification; matter printed in italics indicates the additions made by reissue.

*This application is a reissue of U.S. patent application Ser. No. 09/508,519, filed Sep. 27, 2000 now U.S. Pat. No. 6,347,017, which is a 371 of PCT/JP98/04286, filed Sep. 25, 1998.*

TECHNICAL FIELD

The present invention relates to a composition for coating which contains a radiation-curable compound, more particularly, a radiation-curable composition for coating which can form an ink receiving layer, on which image information and literature information can be printed with an ink jet method.

The present invention also relates to an optical recording medium having an ink receiving layer formed of the radiation-curable composition for coating.

BACKGROUND ART

Recently, in an optical recording medium, there has been a greater demand for providing a surface opposite to a surface on which optical writing/reading is performed, with an ink receiving layer (lebel printing surface) and printing images or literatures representing a recorded content in the medium with an ink jet method so as to arrange the optical recording medium.

As an ink used for an ink jet recording method, there is usually used an aqueous one and, in many cases, a polyhydric alcohol or the like is added to this ink in order to prevent clogging of a nozzle.

On the other hand, as a substrate on which recording is made in the ink jet recording method, there have hitherto been used a normal paper, and a hydrophilizied paper such as a specialty paper for ink jet which is provided with a porous ink receiving layer. As such an ink receiving layer, there are described, for example, the use of a water-soluble high polymer of poly (vinyl alcohol) and polyacrylic acid in Japanese Laid-open Patent Publication No.60-168651/1985, the use of hydroxyethyl cellulose in Japanese Laid-open Patent Publication No.60-262685/1985, the use of a mixture of carboxymethyl cellulose and polyethylene oxide in Japanese Laid-open Patent Publication No.61-181679/1986, and the use of a mixture of water-soluble cellulose and poly (vinylpyrrolidone) in Japanese Laid-open Patent Publication No.61-193879/1986. Since the water-soluble polymers described in these laid open publications are very hydrophilic, they have affinity with a hydrophilic substrate such as a paper and the like and, when an ink receiving layer composed of these water-soluble polymers is provided on the surface of a hydrophilic substrate, there arises no problem on adhesion between the substrate and the ink receiving layer.

However, for example, the water-soluble polymers described in the aforementioned laid open publications have little affinity with substrates having the surface of strong hydrophobicity such as an ultraviolet-curing resin and the like frequently used in a protecting membrane for the optical recording medium. For that reason, when an ink receiving layer composed of these water-soluble polymers is provided on the surface of a hydrophobic substrate, adhesion between the hydrophobic substrate and the ink receiving layer is worse and, after laminated, they are easily peeled and, additionally, since the ink receiving layer itself has the lower water-resistance, there are occurrence of an ink blot caused by a water droplet after printing and stickiness of the surface, which leads to a problem of practical use.

DISCLOSURE OF THE INVENTION

Object of the Invention

Therefore, an object of the present invention is to provide a composition for coating which overcomes the aforementioned problems of the prior art, and which can form, in one coating step, an ink receiving layer which is excellent in clearness of an image and quick-drying and which is excellent in adhesion with a hydrophobic substrate, the water-resistance and the stability of printing such as no occurrence of printing fall or no occurrence of separation of the whole layer even when wiped after wetting with water.

An another object of the present invention is to provide an optical recording medium having an ink receiving layer formed of this composition for coating.

SUMMARY OF THE INVENTION

The present inventor studied intensively and, as a result, found that the aforementioned objects can be attained by a composition comprising a radiation-curable acrylic compound with a water-absorbing organic filler and a water-absorbing inorganic filler added, which resulted in the completion of the present invention.

That is, the present invention is a composition for coating which comprises a radiation-curable compound (A) containing a monofunctional (meth) acrylic monomer and multifunctional more than bifunctional (meth) acrylic monomer, a water-absorbing organic filler (C) and a water-absorbing inorganic filler (D).

In the composition of the present invention, the radiation-curable compound (A) preferably contains 50-90% by weight of the monofunctional (meth) acrylic monomer and 10-50% by weight of the multifunctional more than bifunctional (meth) acrylic monomer.

In the composition of the present invention, the composition preferably contains 10-60% by weight of the water-absorbing organic filler (C) and 1-20% by weight of the water-absorbing inorganic filler (D) relative to the radiation-curable compound (A).

In the present composition, a particle size of the filler (C) and (D) is preferably 0.001 to 20 μm.

In the composition of the present invention, the composition preferably contains 0.001 to 10% by weight of a polymerization initiator relative to the radiation-curable compound (A).

The present invention is also a recording material having an ink receiving layer composed of a radiation-cured aforementioned composition for coating on at least one side of a hydrophobic supporting substrate.

The present invention is also an optical recording medium having an ink receiving layer composed of a radiation-cured aforementioned composition for coating on the surface opposite to the surface of the optical recording medium on which optical writing/reading is performed.

DETAILED DESCRIPTION OF THE INVENTION

Figure 1:
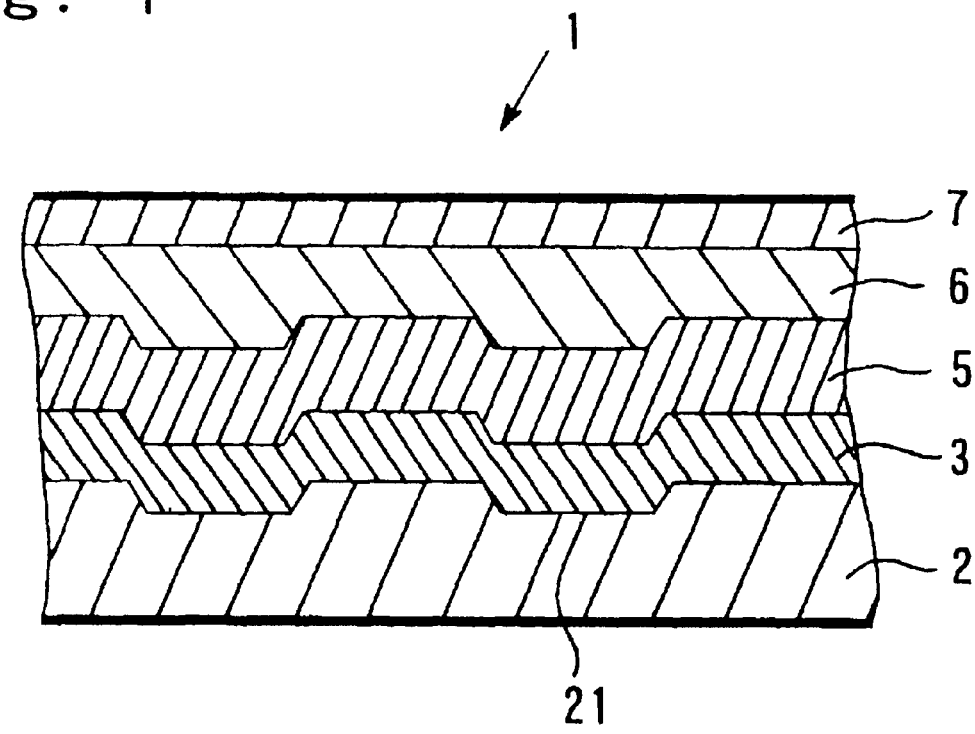
FIG. 1 is a view showing a partial cross-section of one embodiment of an optical recording disk in accordance with the present invention.

In the composition of the present invention, the radiation-curable compound (A) contains a monofunctional (meth) acrylic monomer and, as a cross-linking agent, a multifunctional more than bifunctional (meth) acrylic monomer.

The cured (meth) acrylic is highly hard, highly adhesive and highly cross-linked and has good adhesion to substrates having the hydrophobic surface such as ultraviolet-cured resins frequently used in a protecting film for optical recording medium.

In the present invention, examples of the monofunctional (meth) acrylic monomer, as a cross-linking agent, are not limited to specified ones but include alkyl (meth) acrylate such as ethyl (meth) acrylate, propyl (meth) acrylate, n-butyl (meth) acrylate, 2-ethylhexyl (meth) acrylate and the like, (meth) acrylic acid, (meth) acrylonitrile, (meth) acrylamide, N-substituted (meth) acrylamide, N-methylol (meth) acrylamide, hydroxyethyl (meth) acrylate, carboxyethyl (meth) acrylate, (meth) acryloylmorpholine, ethylene glycol mono (meth) acrylate, diethylene glycol mono (meth) acrylate, polyethylene glycol mono (meth) acrylate, dimethylaminopropyl (meth) acrylamide, tetrahydrofurfuryl (meth) acrylate and the like.

Among them, the high hydrophilic monomers having hydroxy group, carboxy group, amino group, morpholino group, or tetrahydrofurfuryl group are preferable.

Examples of the multifunctional more than bifunctional (meth) acrylic monomer as a cross-linking agent are not limited to specified ones and include ethylene glycol di (meth) acrylate, diethylene glycol di (meth) acrylate, polyethylene glycol di (meth) acrylate, 1,6-hexane glycol di (meth) acrylate, pentaerythritol tetra (meth) acrylate, pentaerythritol (meth) acrylate, trimethylolpropane tri (meth) acrylate, trimethylolpropane di (meth) acrylate, and acrylic-modified urethane elastomer, as well as the aforementioned multifunctional (meth) acrylic monomers with a functional group such as COOH and the like introduced.

Among them, ethylene glycol di (meth) acrylate, diethylene glycol di (meth) acrylate, polyethylene glycol di (meth) acrylate, pentaerythritol tetra (meth)acrylate, pentaerythritol (meth) acrylate, trimethylolpropane tri (meth) acrylate, and trimethylolpropane di (meth) acrylate and the like are preferable.

In the composition of the present invention, it is preferable that the radiation-curable compound (A) contains 50-90% by weight of the monofunctional (meth) acrylic monomer and 10-50% by weight of the multifunctional more than bifunctional (meth) acrylic monomer.

When the multifunctional (meth) acrylic monomer, as a cross-linking agent, is less than 10% by weight, it tends to arise a problem of curability upon curing a composition or strength of a cured film. On the other hand, when the amount exceeds 50% by weight, there is a tendency that resulting cured film becomes too hydrophobic and printability is deteriorated.

It is more preferable that the radiation-curable compound (A) contains 60-90% by weight of the monofunctional (meth) acrylic monomer and 10-40% by weight of the multifunctional (meth) acrylic monomer.

In addition, in the composition of the present invention, a (meth) acrylic oligomer or polymer, as a cross-linking agent, may be added therein as long as it dose not deteriorate the objects of the present invention.

Since the radiation-curable compound (A) is polymerization-cured by a radiation, in particular, an ultraviolet-radiation, a photopolymerization initiator or a sensitizer is preferably incorporated into the present composition. The photopolymerization initiator or the sensitizer used is not limited to specified ones but may be selected from the conventional ones such as acetophenone type, benzoin type, benzophenone type and thioxanthone type compounds. As the photopolymerization initiator or the sensitizer, a plurality of compounds may be used. The content of the photopolymerization initiator may be 0.001 to 10% by weight, preferably 0.5 to 9% by weight relative to the radiation-curable compound (A).

In the composition of the present invention, examples of the water-absorbing organic filler (C) are not limited to specified ones but include fillers having hydroxy group, carboxy group, amino group or the like on the surface and/or in the interior thereof, more particularly, animal protein ultrafine particles such as Staphyloid AC-3832 (manufactured by Takeda Chemical Industries, Ltd.), Flowbeads EA209 (manufactured by Sumitomo Seika Chemical Co., Ltd.), collagen powder and the like.

In the composition of the present invention, examples of the water-absorbing inorganic filler (D) are not limited to specified ones but include high-purity alumina, silica gel, silica-alumina, talc, diatomaceous earth, calcium carbonate, calcium sulfate, synthetic zeolite and the like. More particularly, there are Silcron G-600 (manufactured by SCM Chemicals), Aerosil TT-600 (manufactured by Aerosil) and the like.

The aforementioned water-absorbing organic filler (C) has an action of enhancing printability after radiation-curation of the composition and, on the other hand, the aforementioned water-absorbing inorganic filler (D) has an action of enhancing coating property of the composition onto a substrate. Therefore, the composition of the present invention contains both the water-absorbing organic filler (C) and the water-absorbing inorganic filler (D) as an essential component. When the filler component is only the water-absorbing organic filler (C), there arises a problem of coating property and pot life and, when the filler component is only the water-absorbing inorganic filler (D), sufficient printability can not be obtained. Inclusion of both the organic filler (C) and the inorganic filler (D) can afford excellent characteristics in coating property and printability.

It is preferred that the composition of the present invention contains 10-60% by weight of the water-absorbing organic filler (C) and 1-20% by weight of the water-absorbing inorganic filler (D) relative to the radiation-curable compound (A). When the amount of the organic filler (C) is less than 10% by weight, sufficient printability is not easily obtained and, on the other hand, the amount of the organic filler (C) exceeds 60% by weight, a cured film having sufficient hardness is not easily obtained. In addition, when the amount of the inorganic filler (D) is less than 1% by weight, coating property tends to be deteriorated and, on the other hand, when the amount of the inorganic filler (D) exceeds 20% by weight, coating property becomes to be deteriorated because of remarkable increase in viscosity. More preferable amount of the filler is 20-50% by weight of the water-absorbing organic filler (C) and 3 to 15% by weight of the water-absorbing inorganic filler (D) relative to the radiation-curable compound (A).

In addition, in the composition of the present invention, it is preferred that a particle size of the water-absorbing organic filler (C) and the water-absorbing inorganic filler (D) is 0.001 to 20 μm respectively. When the particle size is less than 0.001 μm, water-absorbing property tends to be deteriorated and, on the other hand, when the particle size exceeds 20 μm, smoothness of the coated surface tends to be deteriorated and the film tends to be brittle. More preferable particle size of the water-absorbing organic filler (C) or the water-absorbing inorganic filler (D) is approximately 0.1 to 10 μm respectively. Additionally, a particle size used in this specification is a value obtained by a particle size measuring method using a laser and, for example, can be measured using a microtrak manufactured by Nikkiso Co., Ltd. and the like. Additionally, the particle size measuring method using a laser is described, for example, in item "2.2. Interaction of particles and electromagnetic wave" (pp. 85-87) in Ultrafine Particles Handbook (published by Fuji Technosystem (K.K.) on Sep. 5, 1990).

Furthermore, in the composition of the present invention, maleic acid, itaconic acid, N-vinylpyrrolidone and the like which can be copolymerized with an acrylic monomer may be added in addition to the aforementioned components as long as it dose not deteriorate the objects of the present invention.

A recording sheet having an ink receiving layer suitable for an ink jet method is obtained by applying the present coating composition on one side or both sides of a hydrophobic supporting substrate such as polyester type resin, polycarbonate type resin, acrylic type resin and the like, and curing the composition by irradiating with radiation such as an ultraviolet ray.

For irradiating with radiation, an electron beam or the like may be irradiated instead of an ultraviolet ray and, in some cases, an ultraviolet ray may be irradiated after heating. The intensity of an ultraviolet ray to be irradiated to the coated film is usually 50 $mW/cm^2$ or more, and the dose of irradiation is usually approximately 200-2000 $mJ/cm^2$. As an ultraviolet ray source, the conventional one such as a mercury lamp may be used. By an ultraviolet ray irradiation, the aforementioned respective compounds are radical-polymerized and cured.

An optical recording medium having an ink receiving layer suitable for an ink jet method is obtained by applying the coating composition of the present invention on a protecting film of the optical recording medium and curing the composition by irradiating with radiation such as an ultraviolet ray.

One example of the optical recording medium, an optical recording disk, has a layered structure shown in FIG. 1. That is, FIG. 1 is a view showing a partial cross-section of one example of an optical recording disk, wherein an optical recording disk (1) has a coated-type recording layer (3) having a dye as a main component, a reflection layer (5) and a protecting film (6) in this order on a substrate (2), and has, on the protecting film (6), an ink receiving layer (7) composed of the coating composition of the present invention which has been radiation-cured.

The substrate (2) is formed of a resin or a glass which is substantially transparent (preferably, transmittance of 88% or more) to a recording light and a reproducing light (light having wavelength of around 600 to 900 nm, particularly semiconductor laser light having wavelength of around 770-800 nm, especially 780 nm). This makes possible to record on and reproduce from the back of a substrate.

The substrate (2) is a disk having normal size and, when used as a recordable CD, it has a thickness of around 1.2 mm and a diameter of 80 to 120 mm.

As a material for the substrate, it is preferred that resins are used. Various thermoplastic resin such as polycarbonate resin, acrylic resin, amorphous polyolefin, TPX and the like are suitable. The substrate (2) may be prepared according to the known method such as injection molding and the like. Upon this, it is preferred that the predetermined pattern such as a groove (21) or the like is formed on the substrate surface for tracking or addressing. In addition, a resin layer having the predetermined pattern such as a groove or the like may be formed according to a 2P method or the like after manufacturing the substrate (2).

The groove is preferably a spiral continuous-type groove and it is preferred that a depth thereof is 500 to 3000 å, a width thereof is 0.2 to 1.1 μm, in particular 0.3 to 0.6 μm, and a width of land (portion between neighboring grooves) is 0.5 to 1.4 μm, in particular 1.0 to 1.3 sun. By taking such a construction of the groove, a good tracking signal can be obtained without lowering the reflection level of the groove portion. In addition, the groove may be provide with concave and convex for an addressing signal. Furthermore, a recording light is preferably directed to a recording layer in the groove.

The recording layer (3) may contain only one kind of dye or may be in the state where two or more dyes are compatible.

When recording a CD signal, it is preferred that an attenuation coefficient of a recording light and reproducing light wavelength (imaginary part of complex refractive index) k of the recording layer (3) is 0.03 to 0.25. When k is less than 0.03, absorbing rate of the recording layer is decreased and it becomes difficult to perform recording with the conventional recording power. When k exceeds 0.25, the reflectivity is below 60% and it becomes difficult to perform reproduction with the CD specification. In addition, when k is 0.03 to 0.20, particularly 0.03 to 0.15, extremely preferable results are obtained.

In addition, it is preferred that refractive index (real part of complex refractive index) n Is 1.8 to 4.0, more preferably 2.0 to 3.0. When n is <1.8, the reflectivity tends to be decreased and a signal modulating degree becomes smaller, which makes difficult to produce with a CD player. In addition, in order to obtain n>4.0, a raw material dye is obtained with difficulty.

Examples of the light-absorbing dye used in the recording layer (3) are not limited to specified ones as long as they have maximum absorption of 600 to 900 nm, preferably 600 to 800 nm', more preferably 650 to 750 nm and one or two or more may be selected from cyanine type, phthalocyanine type, naphthalocyanine type, anthraquinone type, azo type, triphenylmethane type, pyrylium or thiapyrylium salt type, squarylium type, croconium type, formazan type, metal complex type dye and the like depending upon the purpose.

As the cyanine type dye, cyanine dyes having an indolenine ring optionally having an aromatic condensed ring, particularly benzoindolenine ring are preferable. In addition, it is preferred that the indolenine rings are bonded via a pentamethine chain.

In addition, it is preferred that the light-absorbing dye is used in admixture with a singlet oxygen quencher. Furthermore, it is also preferred that a dye cation and a singlet oxygen quencher anion which are ionically-bonded with each other are used as the light-absorbing dye.

As the quencher, metal complexes of acetylacetonate type, bisdithiol type such as bisdithio-α-diketone type and bisphenyldithiol type, thiocatechol type, salicylaldehydeoxime type, thiobisphenolate type and the like are preferable. In addition, amine type quenchers such as amine type compounds having a nitrogen radical cation, hindered amine and the like are suitable.

As a dye which constitutes the bonded system, cyanine dyes having an indolenine ring are preferable and, as the quencher, metal complex dye such as bisphenyldithiol metal complex and the like are preferable.

Further, although the quencher may be added independently from the light-absorbing dye or may be used in a bonded form, it is preferred that the quencher is added in an amount of 1 mole or less, particularly approximately 0.05 to 0.5 mole relative to 1 mole of total light-absorbing dyes. This can promote light-resistance.

As a dye used in the recording layer, those having n and k described above may be selected from the aforementioned light-absorbing dyes, dye-quencher mixtures, and dye-quencher bonded forms and, alternatively, the dyes may be synthesized by new molecular design.

In addition, k for a recording light and reproducing light of the dye varies in a range of around 0 to 2 depending upon the skeleton and substituent thereof and, thus, there is a limit of the skeleton and substituent upon selection of the dyes having k of 0.03 to 0.25. For that reason, in some cases, there arise a limit on coating solvents and impossible to coat depending upon the substrate material. In addition, in some cases, vapor film forming can not be carried out. In addition, when new molecular design is carried out, there requires a great effort for design and synthesis.

This can be applied to the improvement of wavelength dependency. The wavelength of a semiconductor laser is usually in a range of ±10 nm and, in a commercially available CD players, reflectivity of 70% or more need to be maintained at 770 nm to 790 nm. Generally, k value of the dyes has great wavelength dependency in many cases and, even when k value is suitable at 780 nm, k value becomes remarkably unsuitable at 770 nm or 790 nm in many cases. In such cases, suitable n and k values can be usually obtained in a range of 780±10 nm by mixing the second dye therein.

As a result, the limitation such as that of a coating solvent of the like is alleviated and it can make possible to use a dye which is easily synthesized and is low cost, a dye having good property, or a refractory dye.

When the recording layer (3) is a mixed dye layer, dyes to be used may be selected from those having n of 1.6 to 6.5 and k of 0 to 2.

In addition, upon measuring n and k, a recording layer is provided at a thickness of around 40 to 100 nm on the predetermined transparent substrate under the actual conditions to obtain a sample for measurement. Then, reflectivity through a substrate of this sample for measurement or the reflectivity from a recording layer side is measured. The reflectivity is measured using a recording-reproducing light wavelength in a manner of mirror reflection (about 50). In addition, transmittance of the sample is measured. From these measured values, n and k may be calculated according to, for example, Kyoritsuzensho "Optics" authored by Kozo Ishiguro pp. 168-178.

The recording layer may be formed by a spin coating method in which a coating solution containing a dye and an organic solvent is used and this coating solution is applied-spread onto a spinning substrate.

The organic solvent used in a coating solution for forming the recording layer may be conveniently selected from alcohol type, ketone type, ester type, ether type, aromatic type, and halogenated alkyl type solvents and the like depending upon a dye to be used. Organic solvents having two or more functional groups per molecule are suitable.

After spin coating, the formed film is dried as necessary.

The thickness of the recording layer thus formed is conveniently set depending upon the desired reflectivity and the like and is usually around 100 to 300 nm.

A reflection layer (5) is provided on the recording layer (3) in a manner of direct adhesion. The reflection layer (5) is composed of Au, Ag or Ag alloy, Au being preferable in view of high reflectivity and good anti-corrosion.

As an Ag alloy, those containing one or more selected from Cu, Ti, V, Ta, Cr, Mo, W, Mn, Fe, Co, Rh, Ni, Pd, Pt, Au, Al and the like, in addition to Ag, are preferable. In order to obtain high reflectivity, it is preferred that the content of Ag is 40 atom % or more.

In order to form the reflection layer (5), various vapor film forming methods such as sputtering, deposition and the like may be used. In addition, it is preferred that the thickness of the reflection layer (5) is 20 nm or more. When the thickness is smaller, the reflectivity is liable to become insufficient.

By taking such a construction of the reflection layer, the reflectivity through the substrate when manufactured into an optical recording disk (unrecorded portion) is 60% or more, in particular 70% or more.

A protecting film (6) is provided on the reflection layer (5).

Although the protecting film (6) is preferably formed by a spin coating method in order to avoid a damage of the reflection layer (5), a screen printing method, a dipping method, a spray coating method and the like may be used. The conditions for forming the protecting film (6) are not particularly limited to specified ones but may be conveniently selected depending upon viscosity of the coating solution, desired thickness and the like.

The thickness of the protecting film is preferably around 1 to 20 μm. When the thickness is smaller, anti-corrosion effect of the reflection layer and the recording layer is liable to be insufficient. Went the thickness is larger, cracks are liable to occur or warpages are liable to occur on a disk, deriving from shrinkage upon curing.

The protecting film is preferably composed of a radiation-cured resin. More particularly, it is preferably composed of a material obtained by radiation-curing a radiation-curable-type compound or its composition for polymerization. Examples thereof include monomers, oligomers and polymers in which groups cross-linkable or polymerizable by radiation are contained or introduced into a molecule, such as acrylic double bonds such as acrylic acid, methacrylic acid and ester compounds thereof, allyl double bonds such as diallyl phthalate, unsaturated double bonds such as maleic acid, and maleic derivatives which respond to an ionization energy and have unsaturated double bonds showing radical polymerizability. These are preferably multifunctional, in particular trifunctional or more and one kind of them may be used or two or more of them may be used together.

As a radiation-curable monomer, the compounds having a molecular weight of less than 2,000 are suitable and, as an oligomer, the compounds having a molecular weight of 2,000 to 10,000 are suitable. Examples thereof are styrene, ethyl acrylate, ethylene glycol diacrylate, ethylene glycol dimethacrylate, diethylene glycol diacrylate, diethyleneglycol methacrylate, 1,6-hexane glycol diacrylate, 1,6-hexane glycol dimethacrylate and the like. Particularly preferred are acryl group-containing monomers and/or oligomers such as pentaerythritol tetra (meth) acrylate, pentaerythritol (meth) acrylate, trimethylolpropane tri (meth) acrylate, trimethylolpropane di (meth) acrylate, acryl-modified urethane elastomer, or the foregoing with an introduced functional group such as COOH and the like, (meth) acrylate of phenol-ethylene oxide adduct, compounds in which a (meth) acrylate group or a ϵ-caprolactone-acryl group is bonded to a pentaerythritol condensed ring shown in Japanese Laid-open Patent Publication No.1-165050/1989 (Japanese Examined Patent Publication No.8-27990/1996), special acrylates and the like. In addition to them, as a radiation-curable oligomer, there are acryl-modified oligoester acrylate and urethane elastomer, and the foregoing with an introduced group such as COOH and the like.

Alternatively, in addition to or instead of the aforementioned compounds, radiation-curable-type compounds obtained by radiation-responsively-modifying thermoplastic resin may be used. Examples of such a radiation-curable resin are resin in which groups cross-linkable or polymerizable by radiation are contained or introduced into a thermoplastic resin molecule, such as acrylic double bonds such as acrylic acid, methacrylic acid or ester compounds thereof, allyl double bonds such as diallyl phthalate, and unsaturated bonds such as maleic acid, maleic derivatives which have unsaturated double bonds showing radical polymerizability. Examples of the thermoplastic resin which can be modified to radiation-curable resin are vinylchloride type copolymer, saturated polyester resin, poly (vinyl alcohol) type resin, epoxy type resin, phenoxy type resin, cellulose derivatives and the like. As other example of a resin which can be used for radiation-responsively-modifying, multifunctional polyester resin, polyether ester resin, poly (vinylpyrrolidone) resin and derivatives thereof (PVP olefin copolymer), polyamide resin, polyimide resin, phenol resin, spiroacetal resin, and acrylic type resins containing at least one of hydroxy group-containing acrylic ester and methacrylic ester as a polymerization component are also effective.

Since the coating composition for polymerization is cured by radiation, particularly ultraviolet radiation, it is preferred that a photopolymerization initiator or a sensitizer is contained in the composition for polymerization. The photopolymerization initiator or the sensitizer used is not limited to specified ones and examples thereof are as described above. The content of the photopolymerization initiator in the composition for polymerization is usually around 0.5 to 5% by weight. Such a composition for polymerization may be synthesized according to the conventional method or may be prepared using a commercially available compound.

As a composition containing a radiation-curable-type compound for forming the protecting film, a composition containing epoxy resin and an photo-cation polymerization catalyst is also suitably used.

As an epoxy resin, alicyclic epoxy resins are preferable and, particularly, those having two or more epoxy groups are preferable. As an alicyclic epoxy resin, one or more of 3,4-epoxycyclohexylmethyl-3,4-epoxycyclohexanecarboxylate, bis-(3,4-epoxycyclohexylmethyl)adipate, bis-(3,4-epoxycyclohexyl) adipate, 2-(3,4-epoxycyclohexyl-5,5-spiro-3,4-epoxy) cyclohexane-metha-dioxane, bis(2,3-epoxycyclopentyl) ether, vinylcyclohexenedioxide and the like are preferable. The epoxy equivalent of the alicyclic epoxy resin is not limited to specified ones but 60 to 300, particularly 100 to 200 is preferable in view of good curability.

As the photo-cation polymerization catalyst, any known ones may be used and particularly not limited to specified ones. For example, one or more of metal fluoroboric acid salt and boron trifluoride complex, bis (perfluotoalkyl-sulfonyl) methane metal salt, aryldiazonium compound, aromatic onium salt of 6A group element, aromatic onium salt of SA group element, dicarbonylchelate of 3A-5A group element, thiopyrylium salt, 6A group element having MF6 anion (provided that M is P, As or Sb), triarylsulfonium complex salt, aromatic iodonium complex salt, aromatic sulfonium complex salt and the like may be used. Particularly, it is preferred that one or more of polyarylsulfonium complex salt, aromatic sulfonium salt or iodonium salt of halogen-containing complex ion, and aromatic onium salt of 3A group element, 5A group element and 6A group element are used.

In addition, an photo-cation polymerization catalyst containing an organometallic compound and an organosilicon compound having photodegradability may be also used. Since such an photo-cation polymerization catalyst is non-strong acid type, adverse effects on the recording layer having high corrosiveness of a an optical magnetic recording disk can be avoided. As an organometallic compound, complex compounds in which alkoxy group, phenoxy group, β-diketonato group and the like are bonded to a metal atom such as Ti, V, Cr, Mn, Fe, Co, Ni, Cu, Zn, Al, Zr and the like are preferable. Among them, particularly, organoaluminum compound is preferable, more particularly, trismethoxyaluminium, trispropionatoaluminium, tristrifluoroacetylaluminium, and trisethylacetoacetonatoaluminium are preferable.

The organosilicon compound having photodegradability produces a silanol by light irradiation such as ultraviolet ray or the like, and the silicon compounds having peroxysilano group, o-nitrobenzyl group, α-ketosilyl group and the like are preferable.

It is preferred that the content of the photo-cation polymerization catalyst in the composition is 0.05 to 0.7 part by weight, particularly 0.1 to 0.5 part by weight relative to 100 parts by weight of the epoxy resin.

Among them, those obtained by radiation-curing, particularly ultraviolet ray-curing a coated film containing the photopolymerization sensitizer or the initiator using a radiation-curable-type compound having an acryl group are preferable.

Upon formation of the protecting film, a coated film for the aforementioned composition for polymerization is irradiated with ultraviolet ray, electron beam or the like to cure it.

In addition, the protecting film may contain various pigment particles as necessary.

An ink receiving layer (7) composed of the coating composition of the present invention which has been radiation-cured is provided on the protecting film (6). The coating composition is applied, for example, by a screen printing method and this is irradiated with a radiation such as ultraviolet ray to cure, leading to an ink receiving layer suitable for an ink jet method.

MODE FOR CARRYING OUT THE INVENTION

The present invention is illustrated by the following Examples but are not limited to them.

EXAMPLE 1

A Recordable-type compact disk (CD-R) having a construction shown in FIG. 1 was manufactured. First, up to formation of a protecting film (6)was performed. That is, a recording layer (3) containing a dye was formed on a polycarbonate resin substrate (2) having spiral continuous grooves, 120 mm in a diameter and 1.2 mm in a thickness with a spin coating method. A reflection layer (5) was formed on this recording layer (3) and a protecting film (6) was further formed thereon.

A coating solution used for forming the recording layer (3) contained a dye and an organic solvent and, as a dye, the following dyes A1 and A2 as well as singlet oxygen quencher Q were used, and the content of A1 in the dye was 60% by weight, that of A2 in the dye was 30% by weight and that of the singlet oxygen quencher was 10% by weight.

A 1

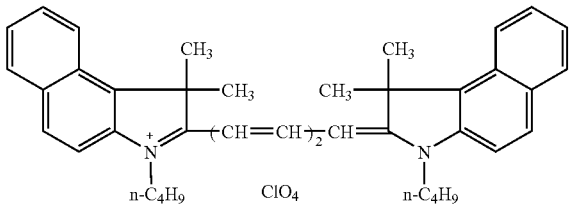

A 2

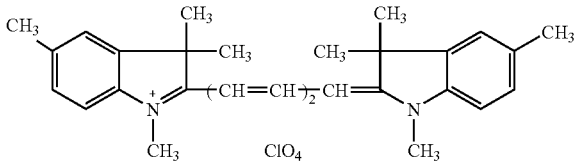

Q

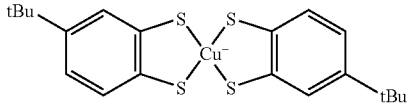

As an organic solvent, diacetonealcohol was used. And, the content of the dye in a coating solution was 5% by weight. And, the thickness of the recording layer was 200 nm.

Subsequently, for each disk, a reflection layer was formed by a sputtering method. The thickness of the reflection layer and the composition thereof were as follows: Reflection layer (80 nm): Au Then, a protecting film (6) was formed on the reflection layer (5). The protecting film (6) was formed by coating an ultraviolet ray-curable resin: SD-211 (manufactured by Dainippon Ink & Chemicals. Inc.) with a spin coating method and performing ultraviolet ray-curing. The thickness of the protecting film after curing was 5 μm.

Then, an ink receiving layer (7) was formed on the protecting film (6) of this disk (I) as follows:

Each component of the following composition was stirred for 1 hour in a mixer to prepare a coating solution No. 11.

| | |
|---|---|
| Monofunctional monomer: | |
| n-1 (Aronix M-5600, manufactured by Toagoseikagaku (K.K.)) | 30 parts by weight |
| Acryloylmorphine | 10 parts by weight |
| Multifunctional monomer: | |
| b-1 (A-600, manufactured by Shin-nakamura Kagakukogyo (K.K.)) | 20 parts by weight |
| Polymerization initiator: | |
| Irgacure 651 (manufactured by Chiba Geigy) | 5 parts by weight |
| Organic filler: | |
| Staphyloid AC-3832 (particle size, 0.3 μm) | 30 parts by weight |
| Inorganic filler: | |
| Silcron G-600 (particle size, 4.7 μm) | 5 parts by weight |

By using this coating solution No. 11, a coated film was formed on the protecting film (6) of the aforementioned disk using a screen printing method. This coated film was irritated with an ultraviolet ray using an extra-high pressure mercury lamp so that the lamp intensity on the irradiated surface was 500 mJ/cm$^2$ to cure, to form an ink receiving layer (7) of about 10 μm. The optical recording medium thus obtained is called sample No. 11.

Coating solution No. 12 was prepared according to the same manner as No. 11 except that trimethylolpropane triacrylate was used instead of monomer b-1 in the coating solution No. 11 and this coating solution No. 12 was used to form an ink receiving layer similarly. This optical recording medium is called sample No. 12.

Coating solution No. 13 was prepared according to the same manner as No. 11 except that 25 parts by weight of monomer a-2 (Aronix M-5700, manufactured by Toagoseikagaku (K.K.)) was used instead of 30 parts by weight of monomer a-1 and 15 parts by weight of polyethylene glycol 90 methacrylate was used instead of 10 parts by weight of acryloylmorpholine in the coating solution No. 11, respectively, and this coating solution No. 13 was used to form an ink receiving layer similarly. This optical recording medium is called sample No. 13.

Coating solution No. 14 was prepared according to the same manner as No. 13 except that dimethylaminopropylacrylamide was used instead of monomer a-2 (Aronix M-5700) in the coating solution No. 13 and this coating solution No. 14 was used to form an ink receiving layer similarly. This optical recording medium is called sample No. 14.

The structures of Aronix M-5600, Aronix M-5700, A-600, and Irgacure 651 used in this Example are shown below:

Aronix M-5600

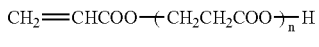

n = 1.4

Aronix M-5700

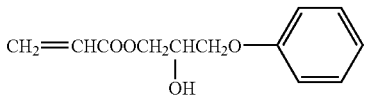

A-600

Irgacure-651

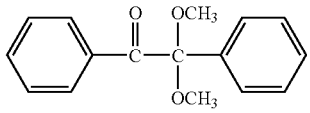

COMPARATIVE EXAMPLE 1

Coating solutions No. 15 and No. 16 were prepared, respectively, according to the same manner as in Example 1 except that the organic filler: Staphyloid AC-3832 was not added and the inorganic filler: Silcron G-600 was added in an amount of 35 parts by weight in the coating solutions No. 11 and No. 12 in Example 1 and the coating solutions No. 15 and No. 16 were used, respectively, to form an ink receiving layer similarly. These optical recording media are called samples No. 15 and No. 16.

Coating solutions No. 17 and No. 18 were prepared, respectively, according to the same manner as in Example 1 except that the inorganic filler: Silcron G-600 was not added and the organic filler: Staphyloid AC-3832 was added in an amount of 35 parts by weight in the coating solutions No. 13 and No. 14 in Example 1 and the coating solutions No. 17 and No. 18 were used, respectively, to form an ink receiving layer similarly. These optical recording media are called samples No. 17 and No. 18.

On the ink receiving layer surfaces of the resulting samples No. 11 and No. 18, printing was performed using an ink jet color printer (manufactured by Mastermind, myPRINTLAB). As an ink, color ink for Canon BJC600J was used.

For printability, surface property, resolution degree and drying property were evaluated as follows:

(Surface property)

The surfaces after screen printing were observed and evaluated as follows:

◎: Very smooth and dry on the surface

○: Smooth and no sticking feeling

Δ: Smooth on the surface but sticking feeling when touched with fingers

X: Remaining mesh trace and bubble trace on the surface (Resolution Degree)

At an overlapping portion between ink and ink or a boundary portion of printing:

◎: No blot

○: Blot of 0.4 mm or smaller

Δ: Blot of larger than 0.4 mm and smaller than 0.8 mm

X: Blot of larger than 0.8 mm and repellence of ink (Drying Property)

Printing was performed and, after printing, time until an ink becomes unadhesvie to fingers when contact with the printed surface is adopted as a drying time and evaluation was performed according to the following criteria:

◎: Drying time is 30 seconds or shorter.

○: Drying time is longer than 30 seconds and 2 minutes or shorter.

Δ: Drying time is longer than 2 minutes and 10 minutes or shorter.

X: Drying time is longer than 10 minutes.

As regards water-resistance, printing was performed and, after drying the printing, the printed surface was dipped in flowing water for 1 minute and ink absorbability and film property were evaluated as follows:

(Ink absorbability)

After and before the printed surface was dipped in flowing water for 1 minutes, the printed characters and images were observed with naked eyes and the change in the concentration was investigated.

○:Little change in the concentration of printing

Δ: The concentration is slightly lower but the printing characters are readable.

X : The printing was lost and becomes unreadable.

(Film property)

After and before the printed surface was dipped in flowing water for 1 minute, the state of the coating layer was observed with naked eyes.

○: Little change in the layer surface

Δ: The layer surface is slightly softened.

X : The layer flows with flowing water or peeled.

The results of the above performance evaluation on each optical recording medium sample are shown in Table 1. From Table 1, it is clear that the ink receiving layers of the samples No. 11 to No. 14 in accordance with the present invention have practically sufficient performance in an ink jet recording method. On the other hand, the ink receiving layers of the comparative samples No. 15 and No. 16 are excellent in surface property but inferior in resolution degree, drying property and ink absorbability. In addition, the ink receiving layers of the comparative samples No.17 and No. 18 are inferior in surface property and film property.

TABLE 1

| | <Printability> | | | Ink <Water-Resistance> | |
|---|---|---|---|---|---|
| Sample | Surface Property | Resolution Degree | Drying Property | Adsorb-ability | Film Property |
| Example 1 | | | | | |
| No. 11 | ○ | ○ | ○ | ○ | ○ |
| No. 12 | ○ | ○ | ○ | ○ | ○ |
| No. 13 | ○ | ◎ | ◎ | ○ | ○ |
| No. 14 | ○ | ◎ | ◎ | ○ | ○ |
| Comparative Example 1 | | | | | |
| No. 15 | ◎ | Δ | X | Δ | ○ |
| No. 16 | ◎ | Δ | X | Δ | ○ |
| No. 17 | X | ○ | ○ | ○ | Δ |
| No. 18 | X | ○ | ○ | ○ | Δ |

EXAMPLE 2 AND COMPARATIVE EXAMPLE 2

Coating solutions No. 21 to No. 28 were prepared, respectively, according to the same manner as in Example 1 and Comparative Example 1 except that Flowbeads EA209 (particle size, 10 μm) was used instead of the organic filler: Staphyloid AC-3832 and Aerosil TT-600 (particle size, 0.04 μm) was used instead of the inorganic filler: Silcron G-600 in the respective coating solutions No. 11 to No. 18 used in Example 1 and Comparative Example 1 and these respective coating solutions No. 21 to No. 28 were used to form an ink receiving layer similarly. These respective optical recording media are called samples No. 21 to No. 28.

For the resulting samples No. 21 to No. 28, the same evaluation as that in Example 1 was performed. As shown in Table 2, it is clear that the ink receiving layers of the samples No. 21 to No. 24 in accordance with the present invention have practically sufficient performance in an ink jet recording method. On the other hand, the ink receiving layers of the comparative samples No. 25 and No. 26 are excellent in surface property but inferior in resolution degree. In addition, the ink receiving layer of the comparative samples No. 27 and No. 28 are inferior in surface property and film property.

TABLE 2

| | <Printability> | | | Ink <Water-Resistance> | |
|---|---|---|---|---|---|
| Sample | Surface Property | Resolution Degree | Drying Property | Adsorb-ability | Film Property |
| Example 2 | | | | | |
| No. 21 | ○ | ○ | ○ | ○ | ○ |
| No. 22 | ○ | ○ | ○ | ○ | ○ |
| No. 23 | ○ | ◎ | ◎ | ○ | ○ |
| No. 24 | ○ | ◎ | ◎ | ○ | ○ |
| Comparative Example 2 | | | | | |
| No. 25 | ◎ | Δ | Δ | Δ | ○ |
| No. 26 | ◎ | Δ | Δ | Δ | ○ |
| No. 27 | X | ○ | ○ | ○ | X |
| No. 28 | X | ○ | ○ | ○ | X |

EXAMPLE 3 AND COMPARATIVE EXAMPLE 3

Coating solutions No. 31 to No. 34 and No. 37 to No. 38 were prepared, respectively, according to the same manner as in Example 2 and Comparative Example 2 except that an animal protein fine particle (particle size, 5 μm) was used instead of the organic filler: Flowbeads EA209 in the respective coating solutions No. 21 to No. 24, and No. 27 to No. 28 used in Example 2 and Comparative Example 2 and these respective coating solutions were used to form an ink receiving layer similarly. These respective optical recording media are called samples No. 31 to No. 34, and No. 37 to No. 38.

For the resulting samples No. 31 to No. 34, and No. 37 and No.38, the same evaluation as that in Example 1 was performed. As shown in Table 3, it is clear that the ink receiving layers of the samples No. 31 to No. 34 in accordance with the present invention have practically sufficient performance in an ink jet recording method. On the other hand, the ink receiving layers of the comparative samples No. 37 and No. 38 are inferior in surface property and film property.

TABLE 3

| | <Printability> | | | <Water-Resistance> Ink | |
|---|---|---|---|---|---|
| Sample | Surface Property | Resolution Degree | Drying Property | Adsorb-ability | Film Property |
| Example 3 | | | | | |
| No. 31 | ○ | ○ | ○ | ○ | ○ |
| No. 32 | ○ | ○ | ○ | ○ | ○ |
| No. 33 | ○ | ◎ | ◎ | ○ | ○ |
| No. 34 | ○ | ◎ | ◎ | ○ | ○ |
| Comparative Example 3 | | | | | |
| No. 37 | X | ○ | ○ | ○ | Δ |
| No. 38 | X | ○ | ○ | ○ | Δ |

EXAMPLE 4

This Example is an embodiment in which a disk (II) having a protecting film (6) composed of two layers was used instead of the disk (I) having the protecting film (6) composed of one layer.

According to the same manner as the formation of the disk (I) in Example 1, the formation up to a reflection layer (5) was performed. On this reflection layer (5), an ultraviolet curable-type resin: SD-211 was coated by a spin coating method, which was ultraviolet-cured to form a lower protecting film having a thickness of 5 Mn after curing. Subsequently, on the lower protecting film, an upper protecting film having a thickness of 8 μm was formed using a white ink for screen printing (SSD F27 WHITE) manufactured by Dainippon Ink & Chemicals. Ink. to make a disk (II).

Then, on the upper protecting film of this disk (II), an ink receiving layer (7) was formed using each of the coating solutions No. 11 to No. 14 used in Example 1 similarly. These respective optical recording media are called samples No. 41 to No. 44.

In addition, the coating solutions No. 21 to No. 24 used in Example 2 were used, respectively, to form each ink receiving layer (7) similarly. These respective optical recording media are called samples No. 51 to No. 54.

Further, the coating solutions No. 31 to No. 34 used in Example 3 were used, respectively, to form each ink receiving layer (7) similarly. These respective optical recording media are called samples No. 61 to No. 64.

For the resulting samples No. 41 to No. 44, No. 51 to No. 54, and No. 61 to No. 64, the same evaluation as that in Example 1 was performed. As shown in Table 4, it is clear that the ink receiving layers of these samples have practically sufficient performance in an ink jet recording method. Since these samples contained a white pigment in the upper protecting film, they had good and clear color development.

TABLE 4

| | <Printability> | | | <Water-Resistance> Ink | |
|---|---|---|---|---|---|
| Sample | Surface Property | Resolution Degree | Drying Property | Adsorb-ability | Film Property |
| Example 4 | | | | | |
| No. 41 | ○ | ○ | ○ | ○ | ○ |
| No. 42 | ○ | ○ | ○ | ○ | ○ |
| No. 43 | ○ | ◎ | ◎ | ○ | ○ |
| No. 44 | ○ | ◎ | ◎ | ○ | ○ |
| No. 51 | ○ | ○ | ○ | ○ | ○ |
| No. 52 | ○ | ○ | ○ | ○ | ○ |
| No. 53 | ○ | ◎ | ◎ | ○ | ○ |
| No. 54 | ○ | ◎ | ◎ | ○ | ○ |
| No. 61 | ○ | ○ | ○ | ○ | ○ |
| No. 62 | ○ | ○ | ○ | ○ | ○ |
| No. 63 | ○ | ◎ | ◎ | ○ | ○ |
| No. 64 | ○ | ◎ | ◎ | ○ | ○ |

The present invention can be carried out in other various embodiments without departing from the spirit or main features thereof. For that reason, the foregoing Examples are merely illustration in all respects and are not construed to be limiting. Further, any changes belonging to the equivalent scope of claims are all within the scope of the present invention.

INDUSTRIAL APPLICABILITY

According to the coating composition of the present invention, as described above, by radiation-curing this composition, there can be formed an ink receiving layer having image clearness in an ink jet recording method, water-resistance and adhesion with substrates.

Therefore, the coating composition of the present invention is very useful for forming an ink receiving layer of the conventional ink let recording material and, particularly, an ink receiving layer of an optical recording medium.

According to the optical recording medium of the present invention, since the medium has an ink receiving layer formed of this coating composition, that is provided a medium to be recorded thereon having the surface layer to be recorded thereon which is excellent in color printing compared with the prior art, has no ink blot or repellence or sticking. In particular, since the ink receiving layer is excellent in quick-drying, it is suitable in printing of high resolution graphics and photographs, and excellent printing having no color both can be performed. Further, even when wiped after dipped in flowing wear, printing fall and whole layer separation are not caused, leading to excellent water-resistance.

What is claimed is:

1. A composition for coating consisting essentially of:

a radiation-curable compound containing a monofunctional (meth) acrylic monomer and a multifunctional [more than] *not less than* bifunctional acrylic monomer; and a water-absorbing organic filler;

a water-absorbing inorganic filler,

*wherein the organic filler is comprised of particles having a diameter of 0.001 to 20 μm, and*

*wherein the inorganic filler is comprised of particles having a diameter of 0.001 to 10 μm.*

2. The composition of claim 1, wherein the radiation-curable compound contains 50 to 90% by weight of the monofunctional (meth) acrylic monomer and 10 to 50% by weight of the multifunctional [more than] *not less than* bifunctional (meth) acrylic monomer.

3. The composition of claim 1, containing 10 to 60% by weight of the organic filler and 1 to 20% by weight of the inorganic filler relative to the radiation-curable compound.

[4. The composition of claim 1, wherein the inorganic and organic fillers are particles having diameters of 0.001 to 20 μm.]

5. The composition of claim 1, containing 0.001 to 10% by weight of a polymerization initiator relative to the radiation-curable compound.

6. A recording material comprising an ink receiving layer composed of the radiation-cured composition for coating of claim 1 on at least one side of a hydrophobic supporting substrate.

7. An optical recording medium which comprises an ink receiving layer composed of the radiation-cured composition for coating of claim 1 on the surface of the optical recording medium opposite to the surface on which optical writing/reading is performed.

8. The composition of claim 1, wherein the organic filler is an animal protein.

* * * * *

UNITED STATES PATENT AND TRADEMARK OFFICE

CERTIFICATE OF CORRECTION

PATENT NO. : RE 40,087 E
APPLICATION NO. : 10/912770
DATED : February 19, 2008
INVENTOR(S) : Tsuyoshi Komaki It is certified that error appears in the above-identified patent and that said Letters Patent is hereby corrected as shown below:

The paragraph in column 1, lines 9-12, should read as follows:
--This application is a reissue of U.S. patent application Ser. No. 09/508,519, filed Mar. 27, 2000, now U.S. Pat. No. 6,437,017, which is a 371 of PCT/JP98/04286, filed Sep. 25, 1998.--

Signed and Sealed this

Fifth Day of August, 2008

JON W. DUDAS
*Director of the United States Patent and Trademark Office*